Feb. 12, 1957 H. L. MILLS 2,781,125
STORAGE FILE FOR PHOTOGRAPHIC SLIDES
Filed May 25, 1953
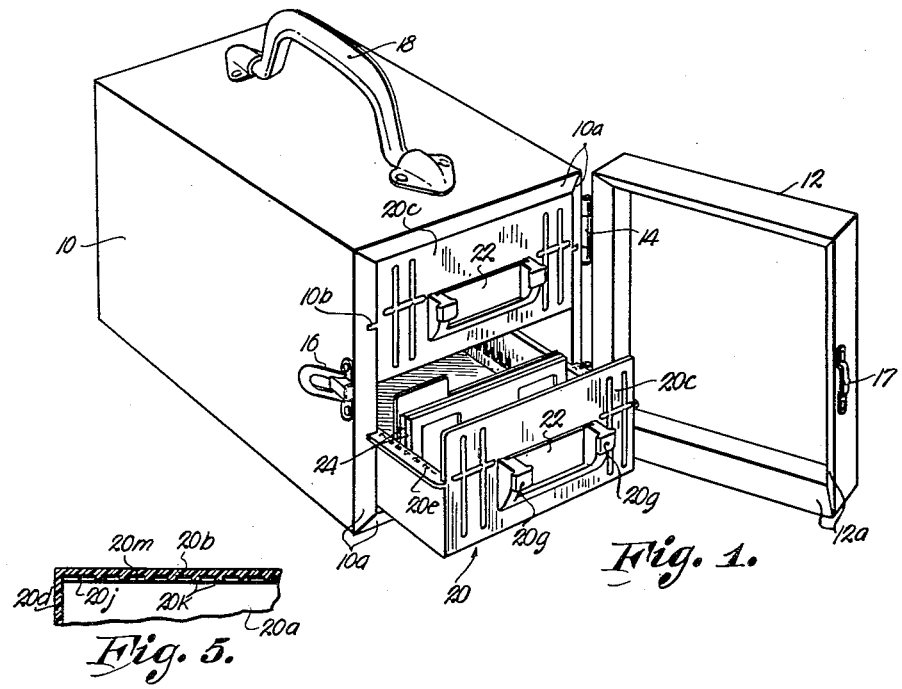
Fig. 1.
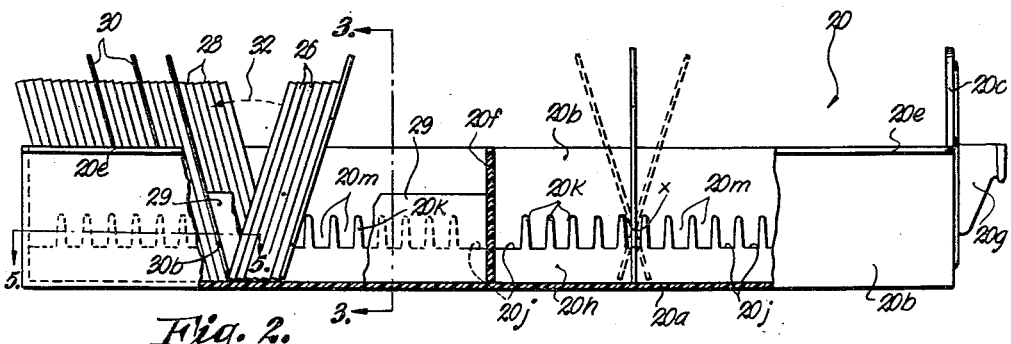
Fig. 2.
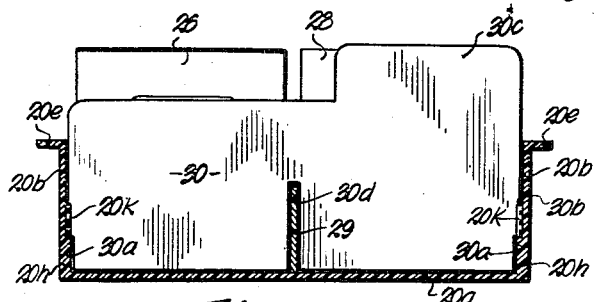
Fig. 3.
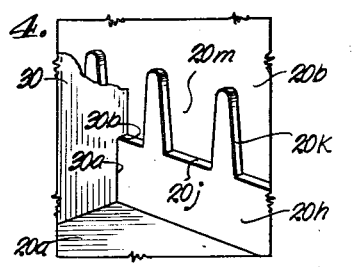
Fig. 4.
Fig. 5.
INVENTOR.
Hiram Lawrence Mills
BY
Thos. E. Scofield
ATTORNEY.

United States Patent Office 2,781,125
Patented Feb. 12, 1957

2,781,125

STORAGE FILE FOR PHOTOGRAPHIC SLIDES

Hiram Lawrence Mills, Prairie Village, Kans.

Application May 25, 1953, Serial No. 357,196

8 Claims. (Cl. 206—73)

The present invention relates in general to chests for the storage of slides or photographic transparencies; and it deals more particularly with a novel slide filing tray or drawer for such chests.

This application is a continuation-in-part of my co-pending application Serial No. 336,589, filed February 12, 1953, now Patent No. 2,701,635, issued February 8, 1955.

An object of the invention is to provide a chest for the storage and filing of slides, which chest is neat and attractive in appearance; capacious without being bulky; dustproof when closed and also easily portable, yet so constructed as to give maximum accessibility to the slides when open.

Another object is to provide a filing tray or drawer which is adapted to receive slides of different size, its arrangement being such that part of the storage space therein can be utilized for "single width" slides, such as those obtained in conventional 35 mm. photography, while another part is used for "double width" slides, such as are obtained in stereo photography; or if desired, the space may be utilized entirely for one or the other of said sizes, making for complete flexibility in the application of the tray to the needs of any user.

A further object of the invention is to provide a tray of the character indicated, which is designed to permit filing and indexing of slides on a "group selection basis," that is to say, the slides are grouped according to subject matter and the separate groups rather than the individual slides within any group are indexed. In connection with this, another important object is to provide a novel and very flexible indexing arrangement which permits grouping of slides without imposing any arbitrary limitation upon the number of slides in any individual group; thus, whether the individual groups in the tray contain a small or large number of slides, whether the various groups are uniform or non-uniform in size, the filing and indexing is accomplished with exceptional efficiency and maximum use is made of all available space within the tray.

An important feature of the invention resides in the provision of means for supporting the slides on edge in a generally upright position, but at the same time permitting them to tilt individually or in groups to facilitate the insertion and removal of the slides from the tray.

Other objects of the invention, as well as additional features of novelty, will appear in the course of the following description.

In the accompanying drawings which form a part of the specification and are to be read in conjunction therewith, and in which like reference numerals are employed to indicate like parts of the various views:

Fig. 1 is a perspective view of my slide storage chest showing the door swung open and one of the drawers or filing trays pulled out partway;

Fig. 2 is a side elevational view of one of the trays with part of the wall broken away to show the interior details;

Fig. 3 is a cross-sectional view taken along the line 3—3 of Fig. 2 in the direction of the arrows;

Fig. 4 is an enlarged perspective view showing details of the arrangement for loosely supporting the indexing separators in my tray; and Fig. 5 is a fragmentary cross-sectional view taken along the line 5—5 of Fig. 2 in the direction of the arrows.

Referring now in more detail to Fig. 1, my slide storage case or chest 10 is generally rectangular in shape and has a front opening provided with an access door 12 hinged thereto at 14. Around the front opening, the wall portions of the case that form the margin of the opening are beveled as indicated at 10a; the rim of the cover has a complementary marginal bevel (12a) to seat thereon when the cover is closed, insuring proper registry between the two and effectively sealing the case against entry of dust or like foreign matter. Any suitable type of latch 16 and cooperating catch 17—the former on the body of the case and the latter on the door—may be employed to releasably lock the door shut when desired. I also prefer to provide the case with a handle 18 to facilitate carrying it about.

The case illustrated is of proper size to accommodate two identical drawers or slide filing trays 20, one above the other. It will be self-evident, however, that the storage capacity may be increased by enlarging the case to receive more drawers of the kind shown. For example, it can be made taller so that three, four or five drawers may be superimposed one above the other in the case, or it can be doubled in width to receive two vertical rows of drawers in side-by-side relation.

It will be convenient now to consider the construction of the individual drawers. Each is in the form of a shallow rectangular tray, the exterior shell of which comprises a flat bottom 20a with upstanding side walls 20b, a forward wall 20c and a rear wall 20d. Extending longitudinally of each side wall along the upper edge thereof is a narrow outwardly projecting flange or lip 20e. Although not essential, I prefer to provide a serial numbering system on the upper faces of these flanges for indexing purposes.

Midway between the forward and rear walls, my drawer has a permanent partition 20f which extends from one side wall to the other. This partition, like the rear wall, has its upper edge flush with the flanges 20e on the side walls. The forward wall, on the other hand, is almost double the height of the side walls. A pair of outwardly projecting knobs 20g are carried on the forward wall; these serve as a drawer pull and they also have provisions for receiving an index card or label 22 therebetween, the structural details of the arrangement being more fully disclosed in my prior application Serial No. 336,589, filed February 12, 1953.

As may best be appreciated from Fig. 1, the two outwardly projecting flanges 20e on the sides of the drawer are slidably received in horizontal grooves 10b in the opposite inside walls of the case 10 for the purpose of supporting the drawer. Preferably the inside length of the case from front to rear is substantially the same as the outside length of the drawer, so that when the latter is pushed in as far as it will go, its forward wall will be flush with the front of the case (see upper drawer in Fig. 1). The vertical spacing of the drawers is such that with both closed, the forward walls 20c are in immediate edge-to-edge relation, effectively closing off the interior of the case and further enhancing the dustproof character of the unit. The inner wall of cover 12 is recessed sufficiently to accommodate the outwardly projecting knobs 20g when the cover is closed.

As will also be clear from Fig. 1, the width of each tray 20 is such as to permit it to receive conventional "stereo" slides 24 between the two side walls. Stereo slides are approximately double the width of standard 2 x 2 inch bound slides and, accordingly, if it is desired to file the latter in the drawer, these may be placed in a double row as indicated at 26 and 28 in Fig. 3. To separate the two rows when this is done, I provide a divider such as 29 which may be inserted longitudinally of the drawer between the partition 20f and the rear wall, or between the partition and the forward wall, or both, as desired. This feature is dealt with fully in my prior application Serial No. 336,589, to which reference may be made for a more complete understanding thereof.

Whether single-width slides (26, 28) or double-width slides (24) are filed in the drawer, an important feature of the present invention resides in my provision for separating them into groups according to subject matter and maintaining the individual groups of slides distinct from one another. For this purpose, I employ separator plates 30 made of metal or other substantially rigid material, which plates are adapted for insertion between the adjacent groups of slides.

When inserted, each separator is loosely supported on the side walls 20b for limited movement relative thereto. To accomplish this, the two walls are thickened along their bottom edges as shown at 20h to provide a generally horizontal ledge or shoulder 20j running longitudinally of the wall. At spaced intervals along the length of this ledge, buttresslike vertical ribs 20k extend upwardly therefrom. These form a series of grooves 20m each of which is directly opposite a corresponding groove on the inside of the other wall. It is preferred to mold the drawer in one piece, and in such case to mold elements 20h and 20k integrally with the walls as shown; however, if desired, elements 20h and 20k may comprise a comb structure made separately from the wall and cemented or otherwise affixed thereto with its teeth directed upwardly in the fashion illustrated. In either case, these elements serve to reinforce the side walls, as well as affording support to the separators 30.

The lower corners of each separator plate are notched out as indicated at 30a to permit the bottom of the plate to enter the space between the thickened portions 20h of the wall. The lateral edges of the plate above these notches are, in effect, ears adapted to be received in opposed ones of the grooves 20m, the base of each ear comprising a shoulder 30b that rests on the ledges 20j and supports the separator plate with its bottom edge elevated slightly above the bottom of the drawer.

As will be clear from Figs. 2 and 4, each groove 20m is considerably wider than the thickness of any separator plate received therein, so the plate is supported only loosely and can tilt forwardly or rearwardly relative to the vertical. Preferably the length of ribs 20k and the spacing between adjacent ones thereof is such as to limit the maximum inclination of the plate to approximately 30° from vertical; thus in the construction shown the length of ribs 20k is about double the width of the grooves 20m, the grooves in turn being about four times as wide as the thickness of plates 30. By increasing the spacing between the ribs and/or reducing their height, it is feasible to increase the maximum inclination angle of the plates, but I do not consider it desirable to allow for an inclination of more than 45° either forwardly or rearwardly.

As any plate is tilted forwardly or rearwardly, it will be understood that its lower edge remains clear of the bottom of the drawer so frictional resistance to such shifting of its position is almost nil. Instead, the plate behaves very much as though pivoted to turn freely about a horizontal axis, and referring to the dotted line positions of the forward plate 30 in Fig. 2, it will be seen that this axis is located not at the bottom edge of the plate but approximately at X—well above the bottom edge. Due to the latter fact, movement of the upper edge of the plate a given linear distance forward or aft produces a greater change in the angle of inclination than otherwise would be the case; or, to put it conversely, a given angular shift can be produced with less traverse movement of the upper edge.

Each plate is provided with an upstanding index tab 30c on which may be inscribed an identifying legend or indicia. This tab likewise affords a convenient means for flicking the plate forwardly or rearwardly with the finger. As will be clear from Fig. 3, each plate also has a centrally located vertical slot 30d which extends upwardly from the lower edge in order that the plate will clear a longitudinal divider 29 if one is used in the drawer. Thus, the tilting movement of any plate is unaffected by the presence of a divider 29.

The tiltable character of the separator plates greatly facilitates the removal and insertion of slides therebetween. As indicated by the dotted arrow 32 (Fig. 2), each slide in turn may be swung about its lower edge from a forward position to a rearward position, and if the slides are individually labeled across their upper margins, the labels or legends may be inspected one after another in this fashion without removing the slides from the drawer. When a desired slide is found, it may be lifted from the drawer and its place then will be marked by the wide space between adjacent slides, so it is very easy to return it to the same place from which it was removed.

In connection with the aforementioned swinging of the slides about their lower edges as indicated by the arrow 32, it is very important to note that it is quite impossible for the outer edge of any slide to foul or jam in the grooves 20m. This advantage results from the fact that the lower ungrooved portion 20h of each wall forms a smooth bearing surface for the edges of the slides, keeping them clear of the grooves. Not only does this insure unhampered movement in the tilting operation but, in the case of cardboard-bound slides, it also guards against the fraying of the edges that would otherwise result due to their catching in the grooves.

Although permitting the slides to tilt within certain limits, the separators serve to generally confine their movement, keeping the slides of each group within a certain well-defined zone. The separators at the ends of any group will, of course, support the slides in that group and hold them upright when an adjacent group is removed from the drawer. It will be self-evident that the different groups may differ from one another in the number of slides they contain; yet adjacent groups can be stored without any substantial gaps therebetween due to the flexibility of my arrangement for positioning the separators at a large number of different points along the length of the tray.

From the foregoing it will be seen that this invention is one well adapted to attain all of the ends and objects hereinbefore set forth, together with other advantages which are obvious and which are inherent to the structure.

It will be understood that certain features and subcombinations may be employed without reference to other features and subcombinations. This is contemplated by and is within the scope of the appended claims.

Inasmuch as various possible modifications of the invention may be made without departing from the scope thereof, it is to be understood that all matter herein set forth or shown in the accompanying drawings is to be interpreted as illustrative and not in a limiting sense.

Having thus described my invention, I claim:

1. In a file, an open-top receptacle having a generally rectangular bottom with a pair of upstanding side walls along the opposite edges of the bottom, the confronting inner surfaces of said walls having opposed ledges spaced above said bottom; a freely movable generally upright separator plate extending crosswise of the bottom and having end portions resting on said ledges, said plate having a bottom edge disposed below the level of said ledges and adjacent to the bottom of the receptacle, said bottom edge being unconfined whereby it is free to move forwardly and rearwardly in a direction transverse to its own length, and means above said ledges for limiting the movement of said plate on the ledges to a predetermined tilting movement and a predetermined movement longitudinally of the ledges.

2. A file as in claim 1 wherein the bottom edge of said plate is below said ledges but spaced above the bottom of the receptacle in all positions of the plate.

3. A file as in claim 1 wherein said limiting means confines said plate to an inclination of less than 45° in either direction from vertical.

4. In a file, an open-top receptacle having a generally rectangular bottom with a pair of upstanding side walls along the opposite edges of the bottom, the confronting inner surfaces of said side walls having opposed ledges spaced above said bottom and vertical ribs extending upwardly from each ledge at intervals along the length thereof, said ledges and ribs being integral with said side walls, a freely movable generally upright separator plate extending crosswise of the bottom and having end portions resting on said ledges, each end portion being loosely confined between a pair of said ribs thereby to restrict the movement of the plate longitudinally of the ledges but allow the plate limited tilting movement on the ledges, said plate having an unconfined bottom portion disposed below the level of said ledges and adjacent to the bottom of the receptacle.

5. A file as in claim 4 wherein the bottom edge of the plate is below the ledges but spaced above the bottom of said receptacle in all positions of the plate.

6. A file as in claim 4, wherein the space between said ribs is of the order of four times the thickness of said plate.

7. A file as in claim 4 wherein said ribs terminate a distance above said ledge, which distance is substantially equal to the distance of the ledge above the bottom of the receptacle.

8. A file as in claim 7, wherein the space between said ribs is of the order of four times the thickness of said plates, and the height of the ribs is approximately double the space between adjacent ribs.

References Cited in the file of this patent

UNITED STATES PATENTS

| 399,215 | Smith et al. | Mar. 5, 1889 |
| 1,273,894 | Madison | July 30, 1918 |
| 2,221,024 | Hood | Nov. 12, 1940 |
| 2,271,678 | Burdick | Feb. 3, 1942 |

FOREIGN PATENTS

| 24,278/35 | Australia | Sept. 3, 1936 |
| 244,356 | Switzerland | Apr. 1, 1947 |
| 262,708 | Switzerland | Oct. 17, 1949 |